United States Patent [19]

Jin

[11] Patent Number: 5,759,619
[45] Date of Patent: Jun. 2, 1998

[54] METHOD OF MANUFACTURING SECOND HARMONIC GENERATION DEVICE

[75] Inventor: Yong-Sung Jin, Seoul, Rep. of Korea

[73] Assignee: LG Electronics Inc., Seoul, Rep. of Korea

[21] Appl. No.: 772,805

[22] Filed: Dec. 24, 1996

[30] Foreign Application Priority Data

Dec. 29, 1995 [KR] Rep. of Korea ............... 1995/67252

[51] Int. Cl.$^6$ .................................................. B05D 5/06
[52] U.S. Cl. .................. 427/163.2; 427/282; 427/287; 427/383.3; 427/383.5; 427/399; 427/404
[58] Field of Search ............................... 427/163.2, 287, 427/404, 399, 282, 383.3, 383.5

[56] References Cited

U.S. PATENT DOCUMENTS

| | | | |
|---|---|---|---|
| 5,380,410 | 1/1995 | Sawaki et al. | 204/130 |
| 5,393,561 | 2/1995 | Bierlein et al. | 427/163.2 |

*Primary Examiner*—Janyce Bell
*Attorney, Agent, or Firm*—John P. White; Cooper & Dunham LLP

[57] ABSTRACT

A method of adaptively varying and locking a wavelength of high power infrared laser diode for use in a blue laser using second harmonic generation. The method including the steps of: forming a pattern for forming a periodic domain inverted area on a substrate of a non-linear medium; performing proton-exchange and quick heat-treatment for the substrate on which the pattern is formed to thereby form the periodic domain inverted area having predetermined period and width; forming a straight optical waveguide and a segmented optical waveguide, in the direction perpendicular to the periodic domain inverted area; and vacuum-evaporating an insulating buffer layer on the substrate where the periodic domain inverted area and the straight and segmented optical waveguides are formed and forming a metal electrode on the insulating buffer layer on the upper portion of the segmented optical waveguide to thereby execute polishing end facet and AR coating.

9 Claims, 4 Drawing Sheets

METHOD OF MANUFACTURING SECOND HARMONIC GENERATION DEVICE

BACKGROUND OF THE INVENTION

1. Field of the Invention

The present invention relates to a blue laser, and more particularly, to a method of adaptively varying and locking a wavelength in a high-power infrared laser diode for use in a blue laser using second harmonic generation.

2. Description of the Related Art

Generally, when an infrared laser having a wavelength of 860 nm is incident on a non-linear medium such as, for example, KTP, $LiNbO_3$, $LiTaO_3$, a blue light having a wavelength of 430 nm as half the incident wavelength is generated, which is called second harmonic generation (hereinafter, referred to as "SHG").

To embody a blue laser having a small size, a light source of incident wave used in a SHG blue laser should be small as a laser diode. A blue conversion efficiency varies considerably in accordance with a wavelength of the incident wave in the SHG blue laser and a bandwidth of the wavelength spectrum. The high power infrared laser diode has a wavelength spectrum having a large bandwidth, a multi-mode having a large number of peaks, and a wavelength varied in accordance with temperature and current, so that it is difficult to embody an effective blue laser.

Accordingly, it is desirable for a laser diode which can reduce the bandwidth of the wavelength, have a single mode having one peak, and adaptively vary and lock the wavelength regardless of temperature and current.

FIG. 1 is a sectional view showing a conventional second harmonic generation device having a periodic domain inversion structure. The periodic domain inversion structure 2 is formed to compensate a phase mismatching between an incident wave and a second harmonic at room temperature.

To effectively convert an infrared laser into a blue light, a phase velocity of the incident wave (infrared laser) in a non-linear medium coincides with that of the second harmonic (blue light wave). If not coincident, the blue light wave is propagated in a medium to generate destructive interference, thereby weakening the strength thereof.

Coincidence of the phase velocity of the incident wave with that of the blue light wave is called "phase matching", but with the non-linear medium, such as KTP, $LiNbO_3$, $LiTaO_3$ it is impossible to realize the phase matching at room temperature.

However, if the phase matching is realized, the strength of the blue light wave is increased to length of medium, squared. Namely, wherever the second harmonic periodically generates the destructive interference, if the domain of the medium is inverted, constructive interference occurs.

Therefore, as if the phase matching has been realized, the strength of the second harmonic is increased to length of medium, squared.

As mentioned above, the phase mismatching can be compensated with the periodic domain inversion structure 2 as shown in FIG. 1, which is called "quasi-phase matching".

In this case, an optical waveguide 3 is formed in such a manner that the energy density is high and the incident wave is propagated in a direction perpendicular to the periodic domain inversion structure 2. The period of the domain inversion is varied in accordance with the phase mismatching between the incident wave and the second harmonic (blue light). The phase mismatching is changed in accordance with the wavelength of the incident wave, temperature of medium and so on. The wavelength of the incident wave where the phase matching occurs is considerably stable and has a narrow bandwidth of about 0.1 nm. Accordingly, it is very important for a laser diode as a light source of the incident wave to serve to lock and adaptively vary the wavelength.

FIG. 2 is a view showing a method of adaptively varying and locking a wavelength in a conventional laser diode. In the figure, an external resonator is used to adaptively vary and lock the wavelength. When light having a specific wavelength among emitted light from the laser diode 4 is fed back, the laser diode 4 is oscillated to the wavelength. Accordingly, if the wavelength of the light fed back is always constant, the laser diode 4 is always oscillated to the wavelength thereof although temperature or current is altered.

A grating 5, which serves to feed back light, is a reflection type grating for reflecting only the light having a specific wavelength in the opposite direction to the incident wave. At the moment, if the angle of grating 5 is changed, the wavelength of light reflected is varied in accordance with the changed angle. Therefore, since the wavelength of light fed back to the laser diode 4 is changed, a lasing wavelength of the laser diode 4 is accordingly varied.

FIG. 3 is a view showing a method of adaptively varying and locking the wavelength in another conventional laser diode using a distributed bragg reflector (hereinafter, referred to as "DBR"), instead of the grating 5 as shown in FIG. 2.

When the refractive index is periodically changed along a forward direction of the incident wave, the incident wave having a specific wavelength is reflected in the opposite direction to a propagation direction of the incident wave. At the time, the wavelength of light reflectable is changed in accordance with the period of variation of refractive index, duty, refractive index and so on. If the temperature is altered, since the refractive index is changed, the wavelength of reflected light can be varied.

However, the conventional laser diodes as shown in FIGS. 2 and 3 have the following problems to be solved: firstly, a separate optical component is needed for matching the phase matching wavelength with the laser lasing wavelength, which makes the size of device considerably large. Secondly, in the method of using the DBR, once the period of variation of the refractive index is determined, the wavelength is not easily variable, which makes the matching of the wavelength of reflected light with the phase matching wavelength very difficult.

SUMMARY OF THE INVENTION

Accordingly, the present invention is directed to a method of manufacturing a second harmonic generation device that substantially obviates one or more of the problems due to limitations and disadvantages of the related art.

An object of the invention is to provide a method of manufacturing a second harmonic generation device which can embody a distributed bragg reflector from which wavelength is variable using an electro-optic effect of a non-linear medium.

To accomplish this and other objects of the present invention, a method of fabricating a second harmonic generation device, including the steps of: forming a pattern for forming a periodic domain inverted area on a substrate of a non-linear medium; performing proton-exchange and heat-treatment for the substrate on which the pattern is formed to thereby form the periodic domain inverted area having a predetermined period and width; forming a metal mask pattern, on a metal mask pattern for forming a straight optical waveguide and a segmented optical waveguide, in the direction perpendicular to the periodic domain inverted area; performing proton-exchange and vacuum-evaporating an insulating buffer layer on the substrate where the periodic domain inverted area and the straight and segmented optical waveguides are formed; and forming a metal electrode on the insulating buffer layer on the upper portion of the segmented optical waveguide and polishing the waveguide facet and coating for anti-reflection.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention: In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
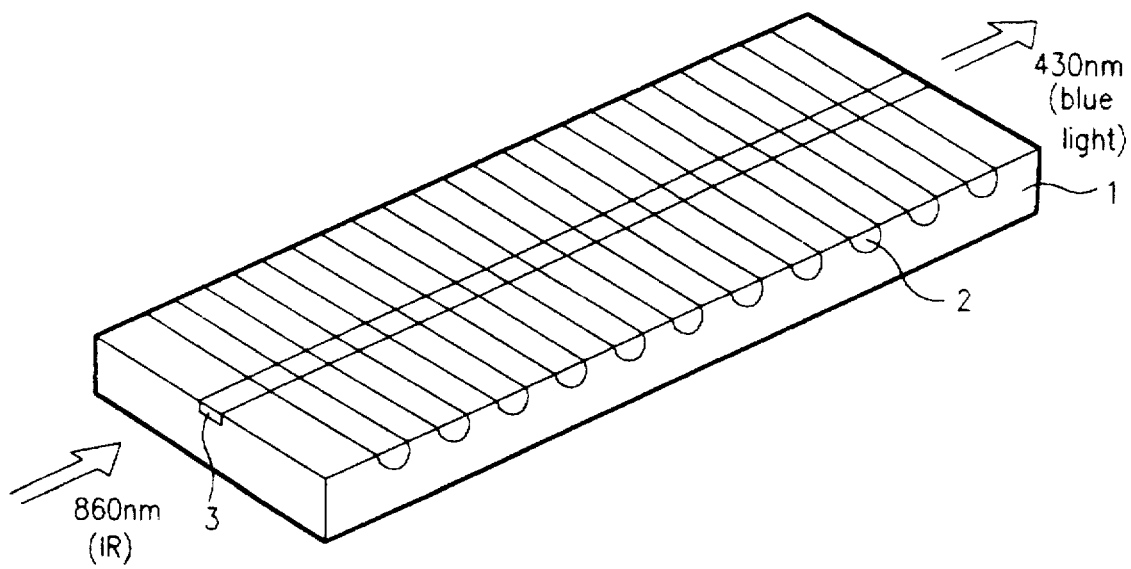
FIG. 1 is a sectional view showing a conventional second harmonic generation device having a periodic domain inversion structure.
Figure 2:
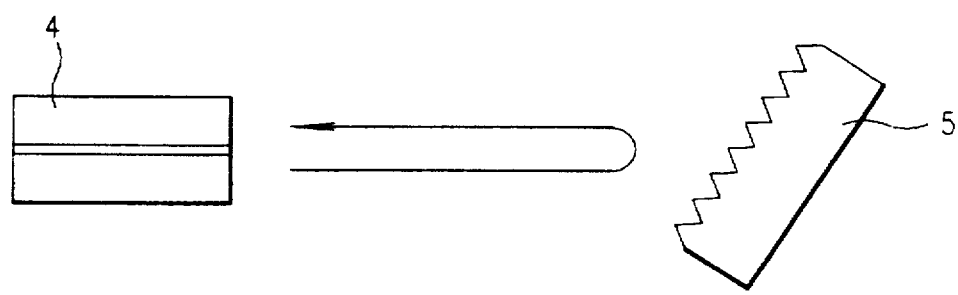
FIG. 2 is a view showing a method of adaptively varying and locking the wavelength of a conventional laser diode.
Figure 3:
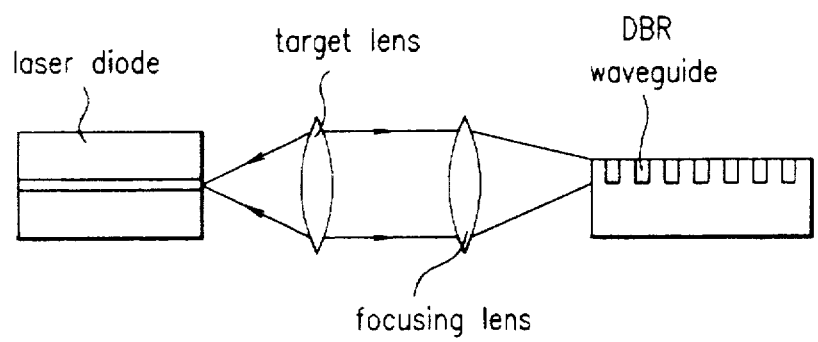
FIG. 3 is a view showing a method of locking and adaptively varying the wavelength of another conventional laser diode using a distributed bragg reflector (DBR)
Figure 4:
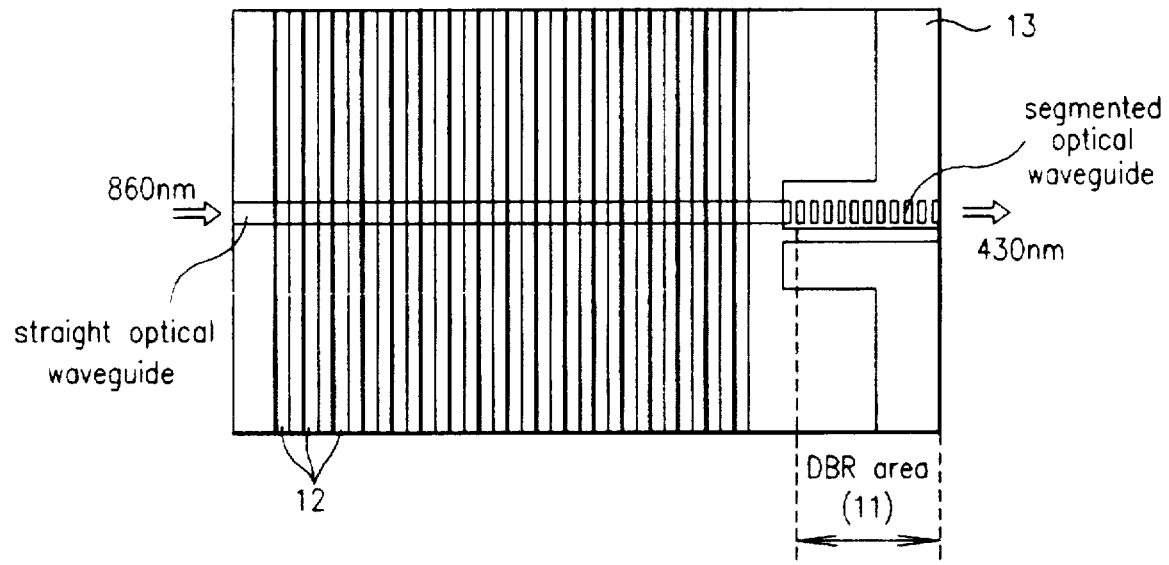
FIG. 4 is a sectional view showing a structure of a second harmonic generation device according to the present invention.

FIG. 4 is a sectional view showing a structure of a second harmonic generation device according to the present invention, and FIGS. 5A to 5E are sectional views showing the manufacturing process of the second harmonic generation device of FIG. 4.

First, a second harmonic generation device according to the present invention embodies a distributed bragg reflector (DBR) from which wavelength is variable using an electro-optic effect. The relationship between the period of the variation of refractive index of the DBR and wavelength of reflected light is given as the follow equation (1):

$$\Lambda = \frac{m\lambda_m}{2n_{\mathit{eff}}} \qquad (1)$$

wherein, m is 1, 2, 3, . . . , $\Lambda$ the period of variation of refractive index, $\lambda_m$ wavelength, and $n_{\mathit{eff}}$ an effective refractive index (the average refractive index within one period of the variation of refractive index.

Therefore, if the period of DBR is determined, the wavelength $\lambda_m$ of the light reflectable is determined. At the moment, the period of DBR is not changed, but the refractive index is varied in accordance with temperature, wavelength of light, the strength of electric field, etc. Accordingly, if the effective refractive index is changed, the wavelength of reflected light can be varied. And, since a non-linear medium such as $LiNbO_3$, $LiTaO_3$ and the like generally have a large electro-optic coefficient, if a strong electric field is applied in the direction parellel or perpendicular to an optical axis of the medium, the refractive index of the medium is varied due to the electro-optic effect. For instance, if the electric field $E°$ is applied in parallel with the optical axis of the non-linear medium $LiNbO_3$, an extraordinary refractive index of the medium is given by the following equation (2):

$$n'_e = n_e - \frac{\gamma_{33} n_e^3}{2} E° \qquad (2)$$

wherein $\gamma_{33}$ is an electro-optic coefficient, which strength represents about $10^{-8}$ cm/v.

Variation of wavelength of light $\Delta\lambda_m$ reflectable of the DBR according to the variation of refractive index caused by the electric field can be obtained by the following equation (3) from the above equations (1) and (2).

$$\Delta\lambda_m = \Delta n_{\mathit{eff}} \frac{2\Lambda}{m} = \frac{\gamma_{33} n_e^3 \Lambda}{m} E° \qquad (3)$$

In this case, the strength of electric field required for the variation of wavelength of about 1 nm is as follows:

$$E° = \frac{m}{\Lambda} \; \frac{\Delta\lambda_m}{\gamma_{33} n_e^3 \Lambda}$$

Wherein, $$\Delta\lambda = 1 \text{ nm} = 10^{-9} \text{ m}$$

$$\frac{\Lambda}{m} = \frac{\lambda m}{2 n e_{\mathit{eff}}} = \frac{860 \text{ nm}}{2.2}$$

$$= 215 \; 10^{-9} \text{ m}$$

$$\gamma_{33} \; 10^{-10} \frac{m}{v}$$

Accordingly, the strength of electric field is given by the following equation (4):

$$E° \frac{1}{215 \; 10^{-10} \text{ m}} \; \frac{10^{-9} \text{ m}}{10^{-10} \frac{m}{v}} \; 10^2 \frac{v}{m} = 1 \frac{v}{m} \qquad (4)$$

Consequently, a voltage level of 1V per 1 m is needed to change by 1 nm the reflectable wavelength of DBR. Generally, since the DBR is a type of optical waveguide having a size of several m, the reflected wavelength of DBR can be effectively variable only with several voltages.

FIG. 4 illustrates a quasi-phase matching second harmonic generation device where a DBR area 11 is additionally formed. Namely, a high efficiency of a blue light wave is generated from a periodic domain inversion area 12, and the reflected light in the DBR area 11 allows the wavelength of the laser diode to be locked. Further, the voltage of an electrode 13 is varied, so that a reflectable wavelength of the DBR area 11 can be changed. Then, using the DBR area 11, the wavelength fed back to the laser diode is changed to thereby make the wavelength of the laser diode adaptively variable.

Accordingly, the lasing wavelength of the laser diode can be matched with the phase matching wavelength of the periodic domain structure by adjusting the voltage of the electrode.

An explanation of a method of manufacturing a second harmonic generation device according to the present invention will be discussed with reference to FIGS. 5A to 5E and 6.

Figure 5A:
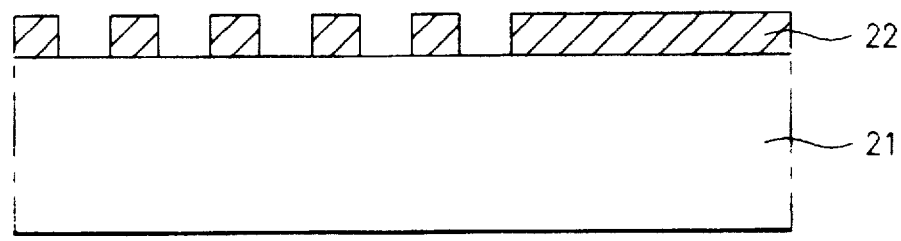
FIGS. 5A to 5E are sectional views showing the manufacturing process of the second harmonic generation device of FIG. 4.
Figure 5B:
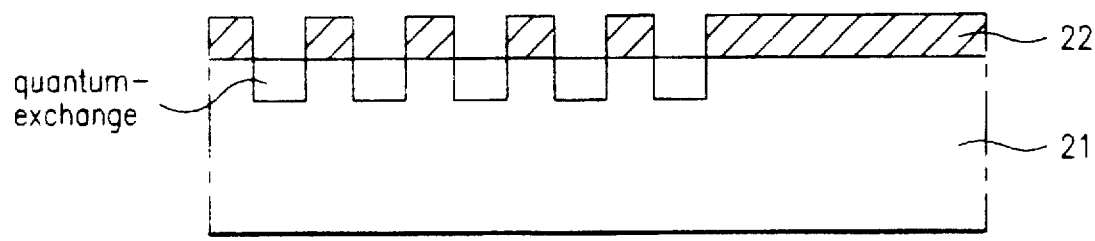
Figure 5C:
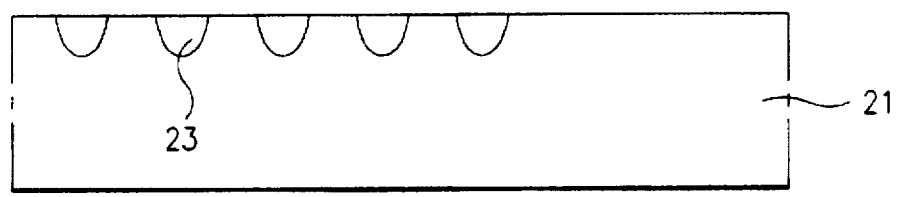
Figure 5D:
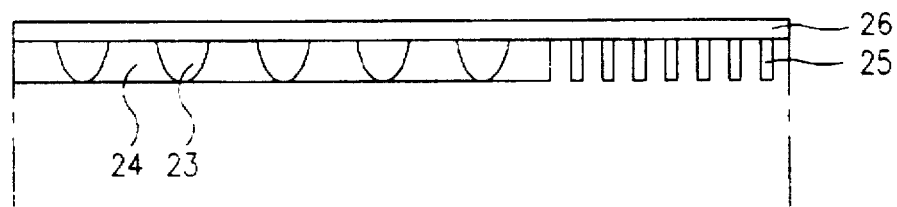
Figure 6:
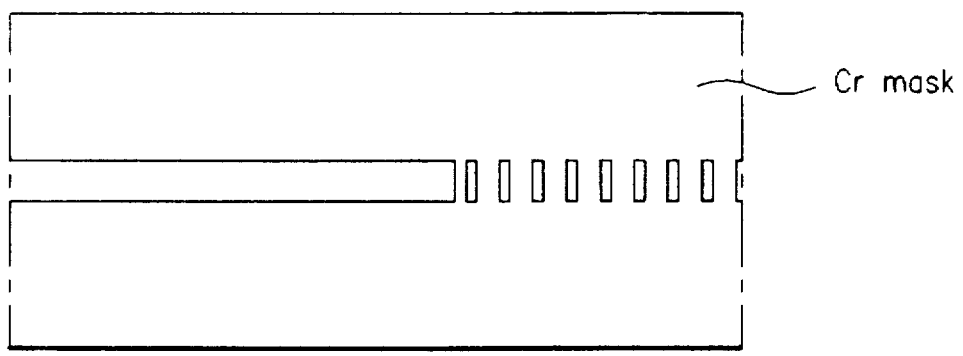
FIG. 6 is a view showing a pattern mask for forming straight and segmental optical waveguides.

As shown in FIG. 5A, a metal grating pattern having a period of 3–4 m is formed on a substrate 21 of a non-linear medium LiTaO$_3$ or LiNbO$_3$. And the substrate 21 is dipped into a benzoic acid or pyrophosphoric acid of about 200° C.~300° C. for about 10~30 minutes to perform a proton exchange. Further, the substrate 21 for which the proton exchange is completed is quick heat-treated below Curie temperature for about 10~60 seconds, as shown in FIG. 5C, to thereby form a periodic domain inverted area 23. Next, as shown in FIG. 5D, so as to form a straight optical waveguide 24 and a segmented optical waveguide 25 on the substrate 21 where the periodic domain inverted area 23 is formed, a chromium (Cr) mask is formed as shown in FIG. 6. Using the chromium (Cr) mask, the straight optical waveguide 24 and the segmented optical waveguide 25 are formed in the direction perpendicular to the periodic domain inverted area 23, as shown in FIG. 5D. The period of DBR grating is about 2 m, and the substrate 21 is dipped into a benzoic acid or pyrophosphoric acid of about 200° C.~300° C. for about 10~30 minutes to perform a proton exchange. Further, the substrate 21 for which the proton exchange is completed is heat-treated at 400° C. for about 1~10 min. Since the Cr masking area is not proton exchanged, the periodic proton exchange can be achieved, and the refractive index of the proton exchanged area is increased. Therefore, the DBR is implemented with the periodic refractive index variation.

Next, Al$_2$O$_3$ or SiO$_2$ 26 is vacuum-evaporated on the substrate 21 of the non-linear medium where the period domain inverted area 23, the straight optical waveguide 24 and the segmented optical waveguide 25 are formed. In this case, the Al$_2$O$_3$ or SiO$_2$ 26 serve to reduce propagation loss due to a metal electrode 27 to be formed in the following process.

Figure 5E:
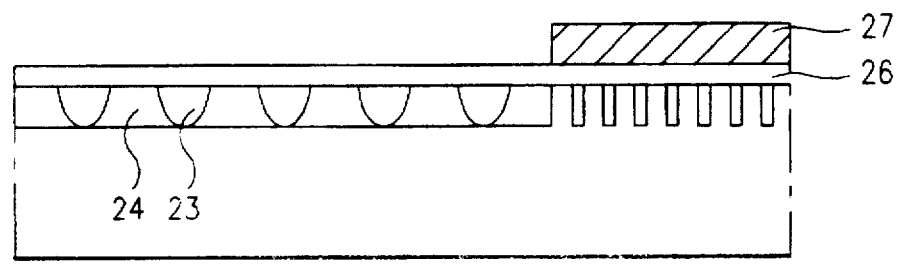

As shown in FIG. 5E, the metal electrode 27 is formed on the Al$_2$O$_3$ or SiO$_2$ on the segmental optical waveguide 25. Then, both end facets are polished and anti-reflection coated to thereby complete the manufacturing process of the second harmonic generation device.

In the second harmonic generation device formed through the above manufacturing process, if light having a wavelength of 860 nm toward one side is incident on the straight optical waveguide, a blue light having a wavelength of 430 nm (half incident wave) is generated to the opposite side.

As apparent from the above, a second harmonic generation device according to the present invention can lock the wavelength of the laser diode as a light source of incident wave to increase a conversion efficiency of a second harmonic. Moreover, a conventional second harmonic generation device has great power consumption since temperature of the device is altered to perform a wavelength variation, whereas the second harmonic generation device according to the present invention can reduce power consumption since the voltage of the device is altered to perform the wavelength variation.

It will be apparent to those skilled in the art that various modifications and variations can be made in a method of manufacturing a second harmonic generation device of the present invention without departing from the spirit or scope of the invention. Thus, it is intended that the present invention cover the modifications and variations of this invention provided they come within the scope of the appended claims and their equivalents.

What is claimed is:

1. A method of manufacturing a second harmonic generation device, comprising the steps of:

forming a pattern for forming a periodic domain inversion area on a substrate of a non-linear material;

performing proton-exchange and heat-treatment for said substrate on which said pattern is formed to thereby form said periodic domain inversion area having a predetermined period and width;

forming a straight optical waveguide and a segmental optical waveguide, for forming an optical waveguide, in the direction perpendicular to said periodic domain inversion area; and forming an insulating buffer layer on said substrate where said periodic domain inversion area and said straight and segmental optical waveguides are formed, and forming a metal electrode on said insulating buffer layer on the upper portion of said segmental optical waveguide, and polishing an end facet, and anti-reflection coating.

2. The method as claimed in claim 1, wherein said proton-exchange is performed by dipping said substrate into a benzoic acid or pyrophosphoric acid of 200°–300° C., and said heat-treatment is then executed below a Curie temperature, to thereby form said periodic domain inversion area.

3. The method as claimed in claim 1, wherein said proton-exchange is executed by dipping said substrate into a benzoic acid or pyrophosphoric acid of 200°–300° C., and said heat-treatment is then executed at 300°–400° C., to thereby form said straight and segmental optical waveguides.

4. The method as claimed in claim 1, wherein said insulating buffer layer is comprised of Al$_2$O$_3$ or SiO$_2$.

5. The method as claimed in claim 1, wherein said non-linear medium is comprised of LiTaO$_3$ or LiNbO$_3$.

6. The method as claimed in claim 1, wherein said pattern for forming said periodic domain inversion area is comprised of chromium (Cr) or Ta.

7. The method as claimed in claim 1, wherein said pattern for forming said optical waveguide is comprised of chromium (Cr) or Ta.

8. The method as claimed in claim 1, wherein said pattern for forming said segmented optical waveguide has a period of about 2 m.

9. The method as claimed in claim 1, wherein said pattern for forming said periodic domain inversion area has a period of 3–4 m.

* * * * *